(12) United States Patent
Fardel

(10) Patent No.: US 9,789,767 B2
(45) Date of Patent: Oct. 17, 2017

(54) TRANSMISSION OF AN ELECTRICAL CURRENT VIA A SLIDING CONTACT

(71) Applicant: MERSEN FRANCE AMIENS SAS, Amiens (FR)

(72) Inventor: Guillaume Fardel, Amiens (FR)

(73) Assignee: MERSEN FRANCE AMIENS SAS, Amiens (FR)

( * ) Notice: Subject to any disclaimer, the term of this patent is extended or adjusted under 35 U.S.C. 154(b) by 244 days.

(21) Appl. No.: 14/239,299

(22) PCT Filed: Sep. 26, 2012

(86) PCT No.: PCT/FR2012/052157
§ 371 (c)(1),
(2) Date: Feb. 18, 2014

(87) PCT Pub. No.: WO2013/045824
PCT Pub. Date: Apr. 4, 2013

(65) Prior Publication Data
US 2014/0311850 A1    Oct. 23, 2014

(30) Foreign Application Priority Data
Sep. 26, 2011   (FR) ...................................... 11 58554

(51) Int. Cl.
*B60L 5/20* (2006.01)
(52) U.S. Cl.
CPC ........... *B60L 5/205* (2013.01); *B60L 2200/26* (2013.01); *Y10T 29/49204* (2015.01)
(58) Field of Classification Search
CPC ........ B60L 5/205; B60L 5/20; B60L 2200/26; B60L 5/08; Y10T 29/49204

USPC ................................ 191/55, 49, 57, 59, 59.1
See application file for complete search history.

(56) References Cited

U.S. PATENT DOCUMENTS 2,856,471 A * 10/1958 Leuchs ................... B60L 5/205
                                                                        191/55
5,657,842 A *  8/1997 Krenkel .................... B60L 5/20
                                                                        191/45 R

FOREIGN PATENT DOCUMENTS

| DE | 535757 | * | 9/1931 |
| DE | 688 221 | * | 2/1940 |
| DE | 2 113 544 | * | 10/1972 |
| DE | 27 49 449 A1 | | 5/1979 |
| DE | 40 36 137 A1 | | 5/1992 |

(Continued)

OTHER PUBLICATIONS

DE 2 113 544, Oct. 1972—English, machine translation.*

(Continued)

*Primary Examiner* — Mark Le
(74) *Attorney, Agent, or Firm* — Sughrue Mion, PLLC

(57) ABSTRACT

A device (100) for transmitting an electrical current between two elements that are movable relative to each other, by a strip (30) containing carbon, which extends in a longitudinal direction and is designed to rub against one of the elements so as to transmit an electrical current, the transmission device including: a strip holder (6), and bearing structure (10) designed to exert force on the strip (30), which urges same against the holder (6), the force being transverse relative to the longitudinal direction, wherein the bearing structure (10) and/or the holder (6) are shaped so as to occupy only a portion of the length of the strip (30) in the longitudinal direction.

14 Claims, 6 Drawing Sheets

(56) References Cited

FOREIGN PATENT DOCUMENTS

| | | |
|---|---|---|
| DE | 43 43 489 A1 | 6/1995 |
| FR | 620048 A | 4/1927 |
| GB | 1158437 A | 7/1969 |
| JP | 35-12008 Y | 12/1955 |
| JP | 6-501369 A | 2/1994 |
| JP | 2010-22142 A | 1/2010 |
| JP | 2010-22143 A | 1/2010 |
| WO | 92/05975 A1 | 4/1992 |

OTHER PUBLICATIONS

Office Action dated May 19, 2015 issued in counterpart Japanese Application No. 2014-531298.
International Search Report of PCT/FR2012/052157, dated Aug. 28, 2013.

* cited by examiner

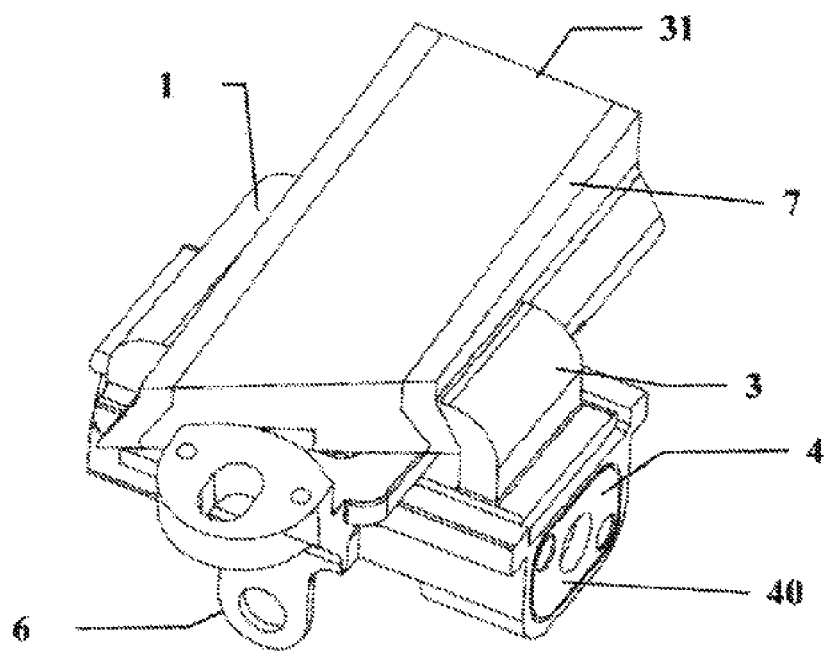
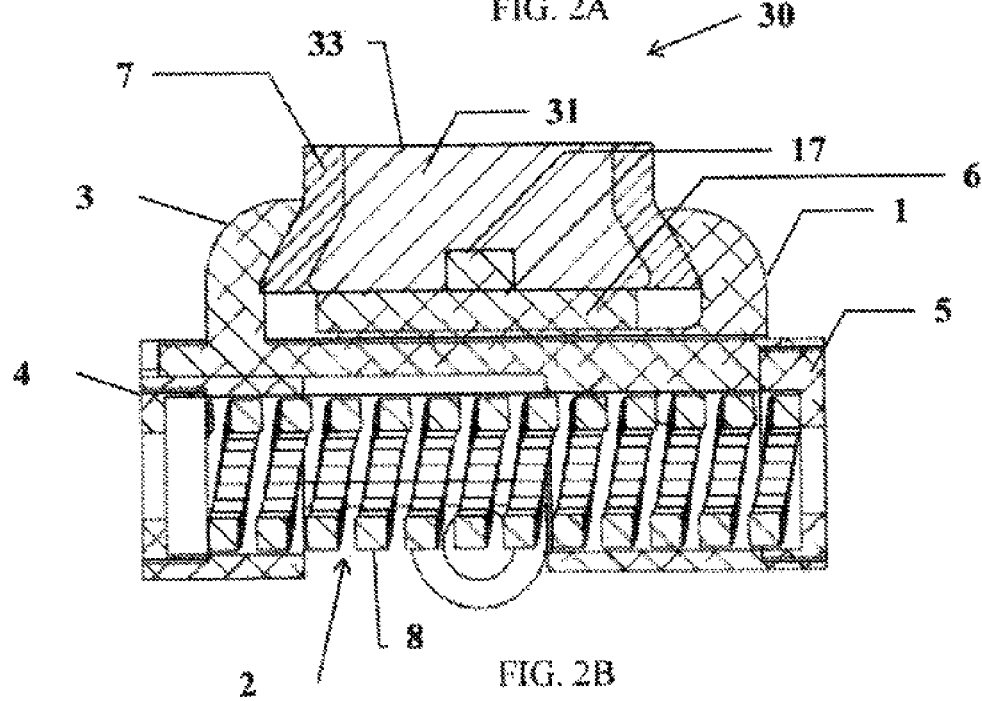
FIG. 2A
FIG. 2B

TRANSMISSION OF AN ELECTRICAL CURRENT VIA A SLIDING CONTACT

CROSS REFERENCE TO RELATED APPLICATIONS

This application is a National Stage of International Application No. PCT/FR2012/052157 filed Sep. 26, 2012, claiming priority based on French Patent Application No. 11 58554, filed Sep. 26, 2011, the contents of all of which are incorporated herein by reference in their entirety.

FIELD OF THE INVENTION

The invention concerns the transmission of electrical current between two elements mobile relative to each other, for example a moving element and a catenary wire. The invention may therefore find applications in the field of rail transport in particular.

BACKGROUND ART

At present, the current is usually transmitted via a strip of carbon rubbing on an element supplied with current, for example a catenary wire, or on a rail. The strip of carbon can therefore be mounted on a pantograph in order to rub on the catenary wire or on a shoe in order to rub on a rail. This rail may be a third rail in addition to the two rails in contact with the wheels of the moving element.

The strip is conventionally retained in a bracket which provides mechanical reinforcement and the assembly of the strip and the bracket is bolted to a support. The bracket provides the mechanical strength of the strip of carbon and also participates in bolting this strip of carbon to a support to fix it.

The application WO2010/070246 describes current transmission systems in which the pick-up strip is not bolted on. This makes it possible to save time when replacing the strips and to limit the risk of cracking that may be associated with bolting on the strip. The bracket includes elastic means that press the strip against the back of the bracket.

There is a requirement for simpler maintenance.

BRIEF DESCRIPTION OF THE INVENTION

There is proposed a device for transmission of electrical current between two elements mobile relative to each other by means of a strip containing carbon extending in a longitudinal direction and designed to rub against one of said elements so as to transmit the electrical current, this transmission device including a strip support and bearing means adapted to exert on the strip a force pressing it against the support, said force advantageously being transverse relative to said longitudinal direction, wherein the bearing means and/or the support are conformed to occupy only a longitudinal portion of the length of the strip.

Thus localized bearing means enable the strip to be pressed against a localized support. This device therefore need include no bracket.

The absence of any bracket can therefore enable manufacture and/or maintenance of this device to be simplified. In particular installation of the strip in a bracket over the whole of its length is avoided.

Moreover, because of the absence of any bracket, this device can be relatively light in weight.

This device can also be more robust than the prior art devices in which, because of the presence of a bracket, the current picked up is obliged to pass through the connection between the strip of carbon and the bracket, with the risk of generating heat that could lead to deformation and rupture of the assembly.

The bearing means may advantageously exert a force directly on the strip, with no intermediary part.

The transverse force exerted by the bearing means may advantageously enable the strip to be pressed directly against the support, with no intermediary part.

The support may advantageously be produced in a conductive material, in order to transmit the electrical current.

The support is advantageously adapted to enable assembly of the strip to the device.

The support may advantageously be conformed to enable installation of the transmission device on an existing system, for example a pantograph of the type known in the prior art. For example, the support may be conformed for fixing it to a part connecting two pantograph horns.

The support against which the strip is pressed may for example comprise a part with a flat portion extending over only a portion of the length of the strip and two ends conformed for fixing them to pantograph horns.

By "only a portion of the length of the strip", whether referring to the bearing means or the support, is meant 50% or less of the length of the strip, advantageously 20% or less of the length of the strip, more advantageously 10% or less of the length of the strip, but more than 0.1% of the length of the strip. For example, the bearing means and/or support may occupy between 4% and 12% inclusive of the length of the strip.

In a manner that is not limiting on the invention, the device may advantageously further include the strip.

The strip may have a length of 2000 millimeters or less, typically 1200 millimeters or less, for example 1000 millimeters, 700 millimeters or less, but as a general rule the strip has a length in its longitudinal direction greater than 200 millimeters.

In a manner that is not limiting on the invention, the strip may advantageously include means for mechanical reinforcement of the strip. These means may be produced in one or more materials different from the material used to rub against the element in order to transmit the current. These reinforcing means may be fastened to the carbon-containing portion of the strip, i.e. the carbon-containing portion of the strip and the mechanical reinforcement means may form a strip in one piece and preferably in different materials so that the reinforcement means are manipulated at the same time as the carbon-containing portion of the strip. When it is installed (respectively replaced), the strip is therefore not installed on (respectively separated from) these reinforcement means.

These strip reinforcement means can provide the mechanical strength of the strip, in particular the resistance to impact and to deformation of the strip. Accordingly, the two functions of the prior art bracket, namely mechanical reinforcement and fixing to the support, are respectively provided by these strip reinforcement means and by the localized bearing means.

In a manner that is not limiting on the invention, the mechanical reinforcement means may advantageously include one or more portions produced in a composite material or composite materials. In fact, some composite materials can make it possible to combine lightness and satisfactory mechanical properties. Moreover, the strip can therefore be more resistant to winter conditions than in the prior art. In fact, a composite material portion can be more resistant to impacts caused by the presence of ice on the catenary and to electrical arcing caused by the electrical contact being broken by ice.

It may also be noted that the use of a composite material for part of the reinforcement can make it possible to increase the service life of the strip.

The composite reinforcement can therefore provide the mechanical functions of stiffening and protection against mechanical impacts and electrical arcing.

In a manner that is not limiting on the invention, the strip reinforcement means may advantageously further include a central reinforcement element, for example a metal rod, disposed inside the strip.

The invention is of course not limited to the presence of such a central reinforcement. The strip may simply comprise a carbon-containing portion and a composite portion.

In a manner that is not limiting on the invention, at least some of the reinforcement means, and in particular the portion or portions in a composite material or composite materials, may advantageously be disposed on the back of the strip and/or on two lateral sides of the strip.

This can make it possible to increase the service life of the pick-up strip by optimizing the quantity of composite material and to improve the mechanical strength of the assembly.

The mechanical reinforcement means need not project relative to the rest of the strip, i.e. they may be flush with the surface of the strip or below it. Thus the strip may advantageously be easier to position on the support, which further favors the stability of the assembly.

Such a geometry can therefore make it possible to optimize the consumption of material in use. When the part is worn, the quantity of material that has to be scrapped can therefore be limited. It may further be noted that the face of the pick-up strip intended to rub against the element supplied with current may form part of the pick-up portion. Accordingly, the catenary wire does not rub on a mechanical reinforcement portion but rather on the pick-up portion. The current is collected directly via the carbon portion, which limits the contact resistance.

In a manner that is not limiting on the invention, the composite material may advantageously contain carbon fibers and/or glass fibers. For example, there may be provision for using carbon fibers braided and then densified with carbon (C/C composite as described in application FR 2 807 365) and then impregnated with phenolic resin. Other composite materials that are quicker to manufacture could also be used, for example:

carbon or glass fibers impregnated with a heatsetting resin; such a composite is routinely used for aerospace parts and for electrical insulators;

a glass or carbon woven material impregnated with a heatsetting resin.

The bearing means may advantageously be produced in one or more materials resistant to corrosion and electrical arcing. It is advantageous for these materials to be light in weight. There may be cited by way of example aluminum, aluminum alloys, plastic materials, composites, etc.

The localized bearing means may be fixed to the strip and to the support by bolting them thereto.

In a manner that is not limiting on the invention, the bearing means may advantageously be adapted to be able to change from a closed state in which the bearing means press the strip against the support to an open state for removing or installing the strip from/in the current transmission device. These two states may be stable, i.e. when the bearing means are placed in a given state, they remain in that state unless acted on by an external force to cause them to change to the other state.

The bearing means can therefore be adapted to adopt a state enabling relatively easy dissociation from the strip. Such an opening or dissociation state thus enables installation and/or removal of the strip alone to be facilitated. Maintenance is therefore simpler and manufacture less costly than in the prior art, in which the bracket is replaced along with the strip.

The bearing means are advantageously adapted to be manipulated by hand or to cooperate with a tool that can be manipulated by hand to change from the closed state to the open state and/or vice-versa. The bearing means are therefore relatively easy to manipulate.

The bearing means may optionally comprise elastic means, for example spring means.

For example, these spring means can enable application of pressure to press the strip against the support or to open the bearing means after unlocking in order to remove or install the strip.

For example, these spring means may comprise a coil spring, a leaf spring and/or a dovetail portion, etc.

In the case of bearing means including leaf springs that press on the strip, a strip may be provided having cavities intended to receive these leaf springs, in order for these leaf springs to exert a pressure on one of the sides of the cavity so as to press the strip against the support.

The bearing means may for example include a threaded rod. For example a threaded rod connected to the two mobile jaws (or to a fixed jaw and a mobile jaw) of a clamp can enable the strip to be clamped by turning this rod. The jaws exert a bearing force on the strip when the threaded rod is turned sufficiently, these jaws having a dovetail shape so that the bearing forces have a component that presses the strip against the support. The threaded rod may be turned by hand or by means of a simple tool of the screwdriver type adapted to interengage with the threaded rod. When the threaded rod is turned to move the jaws sufficiently away from the lateral sides of the strip, it is relatively easy to remove the strip from the rest of the device.

The bearing means may advantageously include or be adapted to cooperate with locking means, for example toggle clamp, eccentric, cam or cam-type eccentric locking means, these locking means enabling the change from the closed state to the open state and/or vice-versa.

The bearing means may advantageously be designed to remain fastened to a current transmission system of the pantograph or shoe type, for example, during replacement of the strip.

The invention is of course not limited to such fastening. For example, bearing means may be provided that are glued or bolted to the strip, for example, and include a cam or eccentric type portion adapted to be turned by a tool to change from a state in which they press on the strip to a release state. Such a quarter-turn lock can be manipulated relatively easily. When this portion is in a release state, unfastening the bearing means in order to remove the strip and install a new one may be envisaged.

In a manner that is not limiting on the invention, the bearing means may advantageously include two jaws conformed to press the strip against the support. These jaws could for example have a slightly oblique face, such a dovetail shape enabling pressing against the back of the support.

In a manner that is not limiting on the invention, an eccentric could advantageously be provided for closing and/or opening the jaws. In particular a spring could be provided that presses on the strip combined with eccentric-type release means, or conversely eccentric-type closure means and spring-type opening means.

In a manner that is not limiting on the invention, an eccentric with a stop notch could advantageously be provided.

In a manner that is not limiting on the invention, the bearing means may advantageously be compatible with the wear and fault detection device described in the publication EP0872374. The support may in fact be conformed so as to define one or more closed cavities when the strip is pressed onto this support. These cavities may be filled with a compressed gas, for example compressed air. When the strip is worn, pressure sensors situated in the head of the pantograph enable the drop in pressure in the cavity or cavities to be detected and therefore an alarm signal to be sent with a view to replacing the strip.

The bearing means can thus provide an electrical connection and a pneumatic seal.

Such a pressurized cavity may optionally be provided in the strip, for example between the pick-up portion and the reinforcement portion, for example by inserting a hollow carbon tube. Compressed air may be circulated in this tube, the ends of this tube being connectable to a pneumatic system enabling any air pressure variation to be detected. When the strip is worn or following an impact, the tube is broken and the change of pressure is detected. Automatic lowering of the pantograph may then be provided for, for example in order to protect the catenary.

In manner that is not limiting on the invention, the transmission device described above is advantageously intended for a pantograph system, i.e. an articulated system intended to be mounted on a roof of a rake. The pantograph system may include one, two or more strips.

Of course, the invention may equally be applied to a shoe system for picking up current from a rail fed with current or any other appropriate application.

The transmission device may therefore comprise or be part of a horned slipper holder of a pantograph.

The invention can therefore find transport applications in the field of trains and metros or any other application involving transmission of current by means of a sliding contact, for example industrial contact slippers.

There is further proposed a tool adapted to cooperate with the device described above and in particular with the bearing means.

The tool may cooperate with the bearing means during strip replacement.

The tool may advantageously include locking means, for example a toggle clamp, a cam, an eccentric, a cam-type eccentric, etc.

The tool may advantageously be adapted to change the bearing means from the open state to the closed state and/or vice-versa.

The tool may advantageously include a handle and the tool may advantageously be designed to enable the change from an open state to a closed state and/or vice-versa by simple rotation of the handle, for example one or more rotations each of one quarter-turn.

There is further proposed a method for installing/uninstalling a carbon-containing strip for a device for transmission of electrical current between two elements mobile relative to each other, this strip extending in a longitudinal direction and being designed to rub against one of these elements so as to transmit the electrical current. The method includes the positioning on/withdrawal from only a portion of the length of the strip of bearing means adapted to press the strip against a support.

The method for installing/uninstalling a carbon-containing strip for a device for transmission of electrical current between two elements mobile relative to each other, said strip extending in a longitudinal direction and being designed to rub against one of said elements so as to transmit the electrical current, includes:

a step of withdrawing/positioning bearing means adapted to exert on the strip a force pressing it against a support, said force being transverse relative to the longitudinal direction, wherein the bearing means and/or the support are conformed to occupy only a longitudinal portion of the length of the strip.

The localized nature of the bearing means can make it possible to avoid all the operations of insertion of the strip into a bracket over the whole of the length of the strip.

BRIEF DESCRIPTION OF THE DRAWINGS

The invention will be better understood in relation to the following figures, in which:

FIG. 2A is a perspective view of bearing means and a strip portion in one embodiment, FIG. 2B is a sectional view of bearing means and a strip portion in one embodiment.

DETAILED DESCRIPTION OF THE INVENTION

Figure 1:
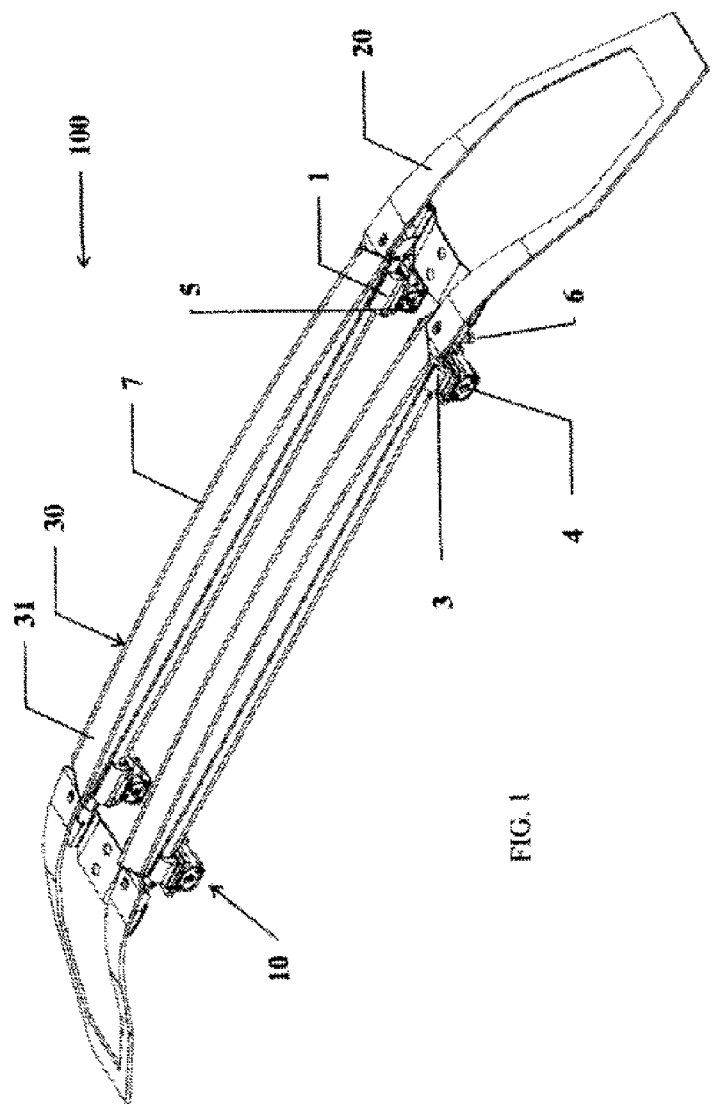
FIG. 1 shows one example of a portion of a pantograph system in accordance with one embodiment of the invention.

FIG. 1 shows a device 100 for transmission of current via a sliding contact, here between a moving element and a catenary wire.

This device 100 includes two strips 30 that rub on the catenary wire. These strips 30 include a carbon-based portion for picking up current, for example a strip 31 of graphite, and a portion 7 for mechanical reinforcement of the strip 30.

This mechanical reinforcement portion 7 is produced in a composite material. This reinforcement portion 7 may for example include carbon fibers braided and then densified with carbon as described in the application FR2807365 and then impregnated with phenolic resin.

The strips 30 are manufactured by molding the composite onto three sides of the carbon portion 31. The strip 30 is produced by steps of polymerization, machining the molded-on strip and sand-blasting/copper-plating the ends of the strip (this enabling improved electrical contact).

The reinforcement portion 7 of the strip surrounds the strip 31 on three of its sides, namely the lateral sides and the back of the strip 31. This reinforcement portion 7 provides the mechanical strength of the strip 30, notably resistance to impact or deformation.

The current transmission device 100 further includes two bearing means 10 for each of the strips 30. These bearing means 10 include two jaws 1, 3 adapted to press against the strip 30. The strip 30 has a section with oblique sides and the jaws 30 have a bearing surface matching these oblique sides so that when the jaws 1, 3 are clamped against the strip 30 a component of the bearing forces linked to the clamping action presses the strip 30 against the support. These bearing means will be better understood in relation to FIGS. 2A, 2B, 2C and 2D.

Figure 2C:
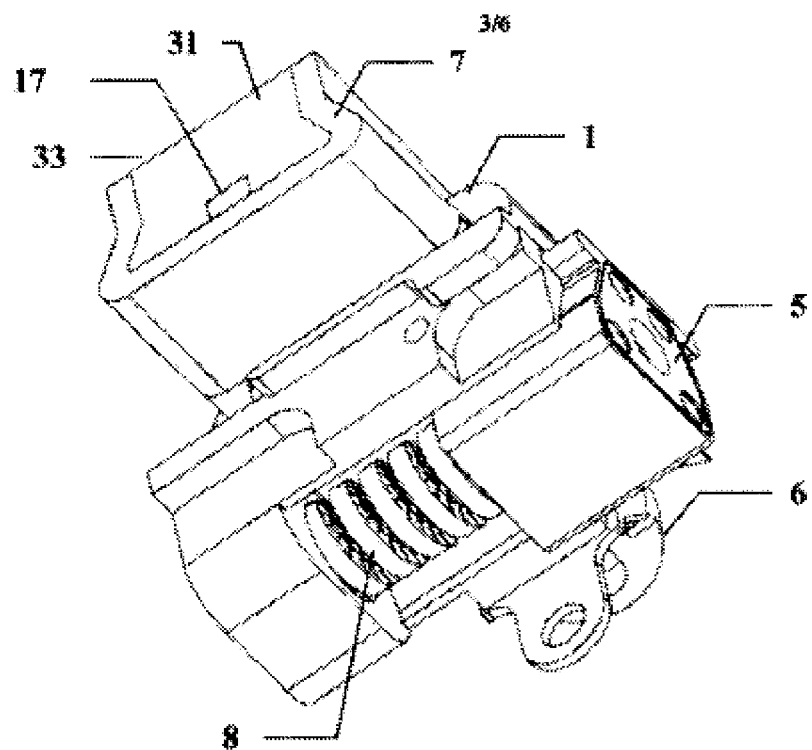
FIG. 2C is a perspective view of bearing means and a strip portion in one embodiment.

In the embodiments of FIGS. 2A, 2B, 2C the strip 30 includes in addition to a current pick-up portion 31:

a composite material portion 7 for mechanical reinforcement of the strip, and a reinforcement element 17 including a metal rod disposed inside the strip 30, here in a recess in the carbon-containing portion 31 on the face opposite the contact face 33 intended to rub against the catenary wire. The central reinforcement element may in particular be stuck to the carbon portion 31. This reinforcement element 17 can enable further reinforcement of the strip 30.

It may be noted that the strips represented in FIGS. 2A and 2B correspond to an embodiment in which the composite portion 7 is disposed on only the lateral sides of the strip 30.

On the other hand, in the FIG. 2C embodiment, the composite material portion 7 is disposed on the lateral sides and on the back of the carbon-containing portion 31.

Referring to these FIGS. 2A to 2D, the bearing means include a fixed jaw 1 and a mobile jaw 3. The mobile jaw is adapted to slide in a transverse direction perpendicular to the longitudinal direction of the strip 30.

The mobile jaw 3 can be pressed against the strip 30 so that the jaws 1, 3 press the strip 30 against a support, for example a connecting or contact portion 6.

This connecting or contact portion 6 extends over a portion of the strip 30 held pressed into the fixing means. This portion 6 is made of a conductive metal, preferably copper, in order to provide a good electrical connection.

The ends of this connecting portion 6 are conformed to fasten the horns 20 (FIG. 1). The horns 20 make it possible to prevent the pantograph snagging the catenary wire and enable the contact wire to be moved onto the wear strips. The horns 20 may be made from a lightweight and corrosion-resistant material such as aluminum.

The bearing means 10 include elastic means, here a coil spring 8. This spring 8 enables loading of a back portion 5 of the mobile jaw, this mobile jaw back portion 5 being fastened to, and possibly in one piece with, the mobile jaw 3. The loading forces exerted by the coil spring 8 are therefore transferred to the mobile jaw 3.

The coil spring 8 is retained in a housing 2 between the back portion 5 of the mobile jaw and a back portion 4 of the housing.

The bearing means represented in FIGS. 2A to 2D are adapted to be able to adopt, in addition to the bearing position represented in FIGS. 2A, 2B, 2C, an open position allowing removal of the strip 30 and installation of a new strip.

Figure 2D:
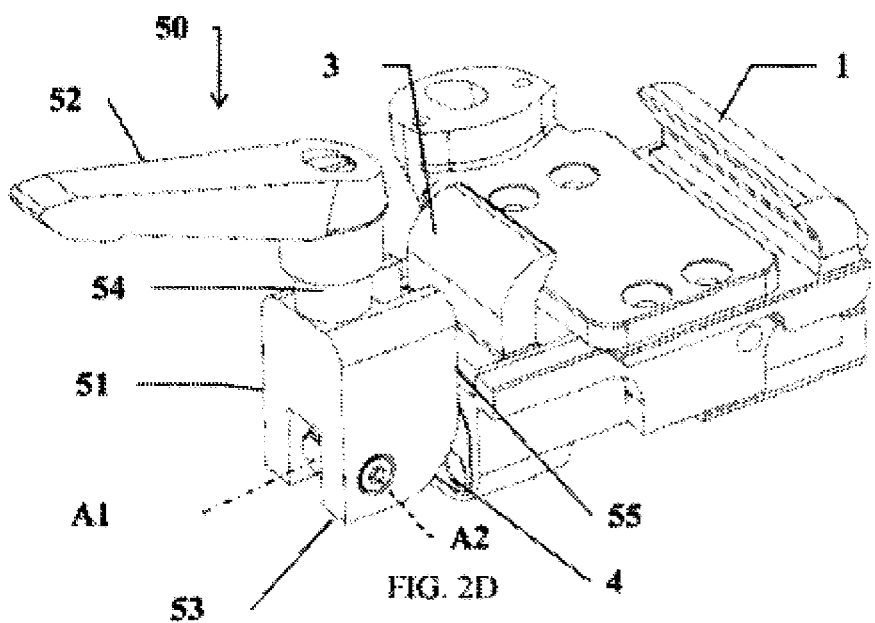
FIG. 2D is a perspective view to show the change to an open state of bearing means in accordance with one embodiment of the invention.

FIG. 2D shows an example of the change to this dissociated state.

The dissociated state may be obtained by locking the back portion 5 of the mobile jaw in a position closer to the back portion 4 of the housing than that represented in FIG. 2B.

This may be achieved by means of a tool 50 including a rod (not visible in FIG. 2D) adapted to interengage with this back portion 5 of the mobile jaw, a handle 52 for holding it in the hand and an eccentric 51 fastened to the handle and articulated to the rod.

This rod may be inserted via the back portion 4 of the housing and therefore have a section with dimensions slightly smaller than those of the main orifice 40 (FIG. 2A) of this back portion 4 of the housing. The section of the rod may be circular, for example.

The end of the rod is designed to interengage with the back portion 5 of the mobile jaw after rotation of the tool about the axis of the rod, for example through 90°, this axis being perpendicular to the longitudinal direction of the strip 30. The rod and the portion 5 are therefore conformed so as to be able to interengage with each other after a rotation of 90°. A person skilled in the art will know how to design a rod and an element with appropriate recesses and protuberances to enable this interengagement.

This interengagement is effected when the eccentric 51 is oriented with its face 53 facing the back portion 4 of the housing, i.e. with the cylindrical portion 54 extending along the rotation axis of the handle 52 then substantially aligned with the axis A1 of the rod. The handle 52 is turned about the axis A1 of the rod, for example through 90°, and the end of the rod then comes to cooperate with the back portion 5 of the mobile jaw. The rod may interengage with the portion 5 from behind, i.e. so that interengagement takes place on the exterior side of the housing 2.

Once the rod of the tool 50 is interengaged with the portion 5, it is then possible to pull on this portion 5 by means of the rod to open the clamp consisting of the jaws 1, 3.

This may advantageously be effected by rotating the assembly comprising the handle 52 plus the eccentric 51 90° about an axis A2 parallel to the longitudinal direction of the strip. The eccentric 51 enables this rotation movement to be transformed into a movement in translation of the rod.

The eccentric 51 may have a shape such that once the rotation has been effected the eccentric 51 comes to rest against the portion 4 over a portion 55 of the surface of the eccentric, thus locking the open position. It is then possible to remove the worn strip and to install a new strip.

Such a tool 50 can therefore enable much quicker maintenance than in the prior art, in which the strip plus bracket assembly has to be unscrewed. As explained above, it in fact suffices to insert the rod of the tool 50 inside the coil spring, to unlock the stop notch of the fixing means, to execute a quarter-turn to interengage with the portion 5 and to lower the handle (or lever) of the tool to open the clamp. The worn strip can then be removed and a new strip installed, after checking that the bearing faces of this new strip are clean. The lever is then raised: the fixing means are closed and the spring acts on the mobile jaw, which compresses the strip. The tool may then be removed.

Figure 3A:
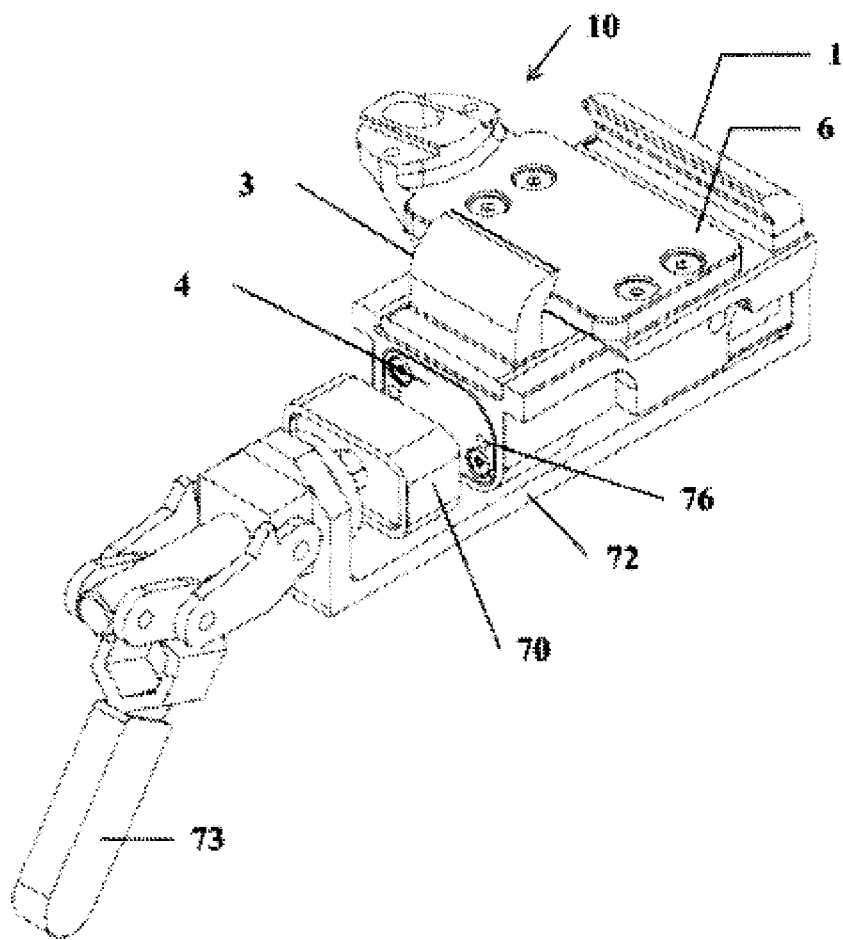
FIG. 3A is a perspective view to show the change to an open state of bearing means in accordance with one embodiment of the invention.
Figure 3B:
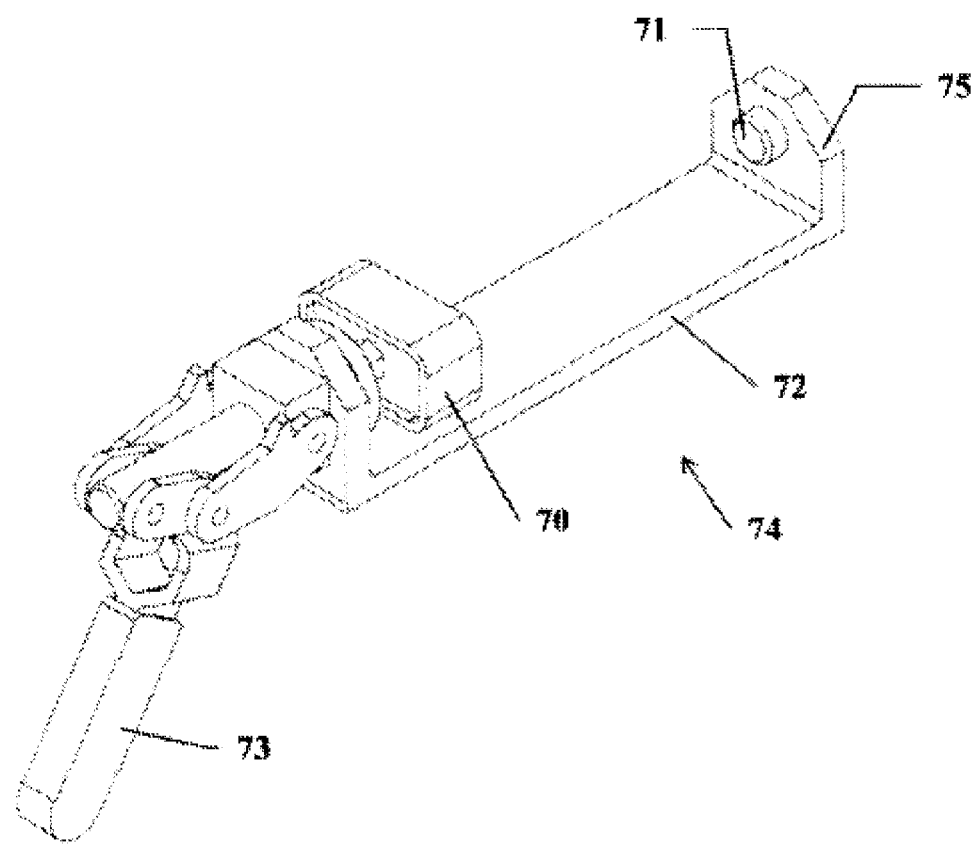
FIG. 3B is a perspective view of the tool from FIG. 3A, FIGS. 4A and 4B are sectional views in a section plane of the strip showing very diagrammatically an example of localized bearing engagement in accordance with another embodiment of the invention.

Referring to the embodiment of FIGS. 3A and 3B, the tool 74 represented in FIG. 3B is adapted to cooperate with bearing means of the type represented in FIGS. 2A to 2D, advantageously with the same bearing means.

The bearing means are intended to be received between a fixed back member 75, fixed to and possibly in one piece with a U-shaped portion 72, and a mobile back member 70.

The fixed back member 75 includes an alignment stud 71 adapted to be received in the main orifice of the portion 5 (FIGS. 2A to 2D).

The mobile back member includes two alignment pins, not represented, adapted to be inserted into orifices 76 in the back of the housing 4.

The assembly comprising the stud plus the main orifice in the portion 5 therefore enables relatively coarse positioning of the bearing means and the assembly comprising the pins plus the orifices 76 enables relatively fine positioning.

The mobile back member 70 is fastened to a handle 73 so that when this handle 73 is actuated in the upward direction the mobile back member is moved closer to the fixed back member 75. If the bearing means 10 are positioned in the tool 74, the mobile back member then comes into abutting engagement against the portion 4. This portion being fixed, the force exerted by the tool on the bearing means will move the portion 5 toward the portion 4, compressing the spring.

The mobile jaw 3 being fastened to the portion 5, this mobile jaw is then moved toward the handle 73 and the strip can be removed and replaced with a new strip.

The handle is then lowered. The mobile back member 70 is then moved back toward the handle and separates from the portion 4. Because of the compression forces exerted by the spring, the portion 5 resumes its initial position. The spring still being compressed, the forces exerted by the spring hold the jaws 1, 3 against the strip (not represented in FIG. 3A).

The walls of the strip and the jaws are oblique, so that the strip is pressed against the support 6.

The invention is in no way limited by bearing means including jaws for clamping the strip.

Figure 4A:
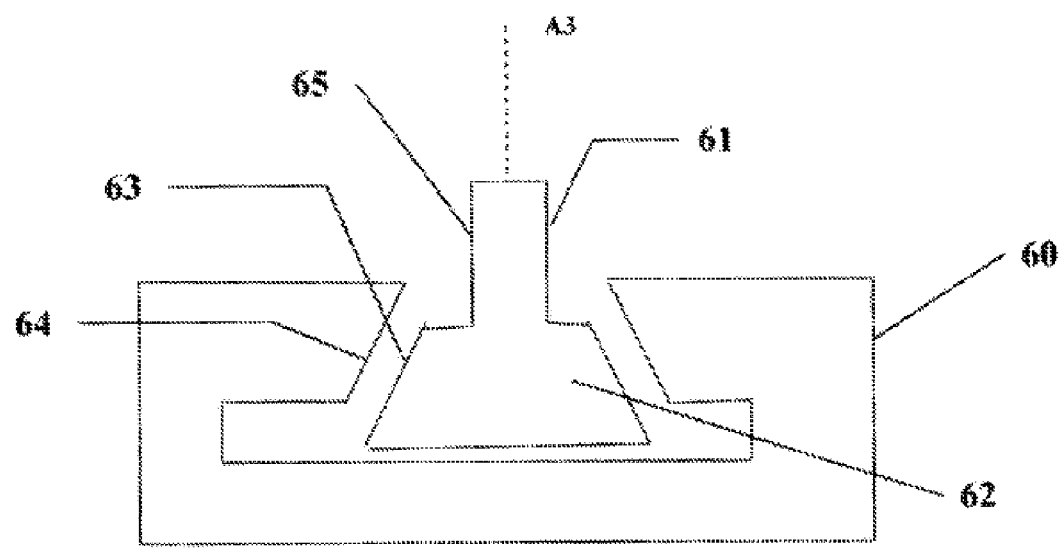
Figure 4B:
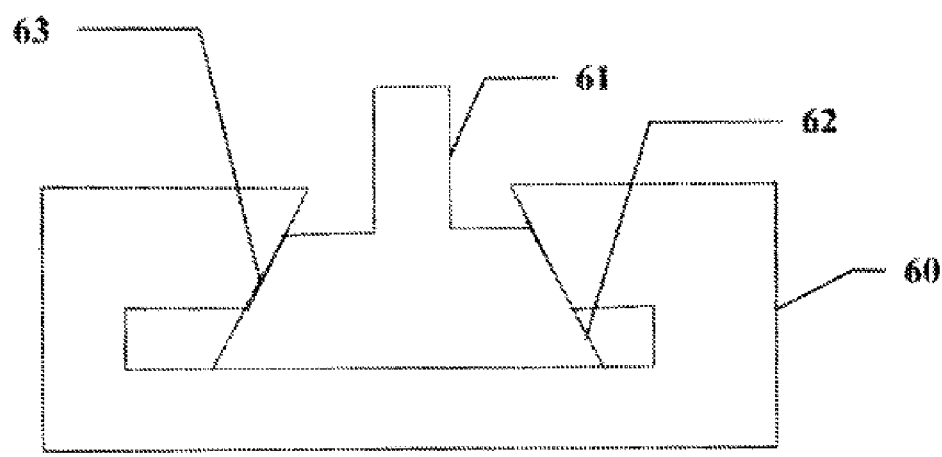

For example, in the embodiment shown very diagrammatically in FIGS. 4A and 4B, a housing 60 may be provided fastened to the back of the strip (not represented), this housing being adapted to receive a locking portion 61 or quarter-turn latch. This locking portion includes a cam portion 62 with an oval base and oblique lateral walls 63 so that the cross sections of this cam portion are trapezium-shaped. The housing 60 includes oblique walls 64 intended to come into contact with the walls of the cam portion when this cam portion is in the locking position. The cam portion 62 then exerts a force against the housing 60 and therefore against the strip.

The cam portion goes from an insertion position, as represented in FIG. 4A, to the locking position of FIG. 4B by rotation about an axis A3. The locking portion includes a portion 65 adapted to cooperate with a tool. This portion 65 may define a recess of hexagonal section, for example, so that the locking portion 61 can be driven in rotation by a tool comprising a rod of hexagonal section. Because of the oval shape of the cam portion 62, the oblique walls 63, 64 of the cam portion and the housing then come to bear against one another.

The walls 63, 64 being oblique, a force is then exerted against the strip.

The portion 61 is partially accommodated in an element (not represented) in contact with a support that is not represented. The force exerted by the locking portion 61 presses the strip against this support.

The cam portion may advantageously define a recess that is not represented and is adapted to receive a stop portion when the locking portion is in the locking position. Return means of the spring type (not represented) can enable engagement of the stop portion in the recess, thus locking the cam portion in the locking position.

To replace the strip, it is necessary first to release the cam portion, for example by applying traction to the stop portion, and then to turn the locking portion by one quarter-turn by means of the hexagonal-section tool. The locking portion can then be removed from the housing.

The invention claimed is:

1. A device for transmission of electrical current between a mobile element and a stationary element mobile relative to each other, by means of a strip containing carbon, extending in a longitudinal direction and designed such that one of its faces rubs against one of the mobile element and the stationary element so as to transmit the electrical current, said transmission device including:
   a strip support arranged for fixing the device to the other one of the mobile element and the stationary element and for transmitting the electric current to/from said other element, and
   bearing means, each bearing means being adapted to exert on the strip a force pressing it against the support, said force being transverse relative to the longitudinal direction,
   wherein the bearing means includes at least two bearing means spaced apart from each other and/or the strip support includes at least two supports spaced apart from each other,
   the at least two bearing means all together and/or the at least two supports all together are conformed to occupy 50% or less of the length of the strip,
   the bearing means includes an element with an inclined surface and spring means that cooperates with said element with the inclined surface,
   the spring means are located on a side of the strip that is opposite to the side of the face that rubs against one of the mobile element and the stationary element, and
   the bearing means are able to change from a closed state in which the bearing means press the strip against the support and the spring means exerts compression forces against the element with the inclined surface, to an open state for removing or installing the strip from/in the current transmission device, by compressing the spring means.

2. The electrical current transmission device as claimed in claim 1, further including the strip and wherein the strip includes means for mechanical reinforcement of the strip.

3. The device as claimed in claim 2, wherein the means for mechanical reinforcement of the strip include at least one portion produced in at least one composite material.

4. The device as claimed in claim 3, wherein the composite material includes carbon fibers and/or glass fibers.

5. The device as claimed in claim 2, wherein at least some of the mechanical reinforcement means are disposed on the back of the strip and on two lateral sides of the strip.

6. The device as claimed in claim 1, wherein two bearing means taken from said at least two bearing means and/or two supports taken from said at least two supports are provided at two respective neighborhoods of the ends of the strip.

7. The device as claimed in claim 1, wherein the bearing means include or are conformed to cooperate with a tool including an eccentric.

8. The device as claimed in claim 1, wherein the bearing means include or are conformed to cooperate with a tool including a toggle clamp.

9. The device as claimed in claim 1, wherein the bearing means include two jaws adapted to be disposed on either side of the strip and conformed to press the strip against the support.

10. The device as claimed in claim 1, wherein the bearing means include elastic means for exerting the force pressing against the support.

11. A tool in combination with the electrical current transmission device as claimed in claim 1, wherein the tool is adapted to cooperate with the electrical transmission device.

12. A pantograph or shoe system including a transmission device as claimed in claim 1.

13. The device as claimed in claim 1, wherein the strip has a length of 200 millimeters or more.

14. A method for installing/uninstalling a carbon-containing strip for a device for transmission of electrical current between a mobile element and a stationary element mobile relative to each other, said strip extending in a longitudinal direction and being designed such that one of its faces rubs against one of the mobile element and the stationary element so as to transmit the electrical current, the method including
- a step of withdrawing/positioning bearing means adapted to exert on the strip a force pressing it against a support, said force being transverse relative to the longitudinal direction,
- wherein the bearing means includes at least two bearing means spaced apart from each other and/or the support includes at least two supports spaced apart from each other,
- the support is arranged for fixing the device to the other one of the mobile element and the stationary element and for transmitting the electric current to/from said other element,
- the at least two bearing means all together and/or the at least two supports all together are conformed to occupy 50% or less of the length of the strip,
- the bearing means includes an element with an inclined surface and spring means that cooperates with said element with the inclined surface,
- the spring means are located on a side of the strip that is opposite to the side of the face that rubs against one of the mobile element and the stationary element, and
- the bearing means are able to change from a closed state in which the bearing means press the strip against the support and the spring means exerts compression forces against the element with the inclined surface, to an open state for removing or installing the strip from/in the current transmission device, by compressing the spring means.

* * * * *